United States Patent
Breuer et al.

(10) Patent No.: US 8,641,942 B2
(45) Date of Patent: Feb. 4, 2014

(54) LASER SCANNING SYSTEMS AND METHODS FOR MEASURING EXTRUDED CERAMIC LOGS

(75) Inventors: Klaus Breuer, Kaiserslautern (DE); Lee Edgar Deeter, Horseheads, NY (US); James Monroe Marlowe, Corning, NY (US); Nicholas Leon Susch, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 99 days.

(21) Appl. No.: 13/103,420

(22) Filed: May 9, 2011

(65) Prior Publication Data

US 2011/0278753 A1 Nov. 17, 2011

Related U.S. Application Data

(60) Provisional application No. 61/333,938, filed on May 12, 2010.

(51) Int. Cl.
*B29C 45/76* (2006.01)
(52) U.S. Cl.
USPC ............................................. 264/40.1
(58) Field of Classification Search
USPC ............................................. 264/40.1
See application file for complete search history.

(56) References Cited

U.S. PATENT DOCUMENTS

| 5,019,993 | A | 5/1991 | Montalcini et al. |
| 2002/0171847 | A1 | 11/2002 | Fukumoto et al. |
| 2010/0045975 | A1 | 2/2010 | Zoeller, III |
| 2010/0274525 | A1* | 10/2010 | Zoeller, III ................ 702/167 |
| 2011/0116704 | A1 | 5/2011 | Zoeller, III |
| 2011/0128370 | A1 | 6/2011 | Booth et al. |

FOREIGN PATENT DOCUMENTS

WO 2009/058247 5/2009

* cited by examiner

*Primary Examiner* — Larry Thrower
(74) *Attorney, Agent, or Firm* — Charles A. Greene; Matthew J. Mason; Joseph M. Homa

(57) ABSTRACT

Laser scanning systems and methods are disclosed herein that can provide quick and efficient measurement of extruded ceramic logs, particularly related to log shape, during manufacture. Two two-dimensional laser scans from respective laser scanners are performed and the resulting laser scan data is combined to form a three-dimensional surface shape measurement of the ceramic log. The systems and methods disclosed herein enable a non-contact measurement of the extruded ceramic log, which reduces the risk of physically damaging the log. The measurement results can be used to adjust the extrusion process of the extruder that forms the extruded ceramic logs.

10 Claims, 12 Drawing Sheets

US 8,641,942 B2

LASER SCANNING SYSTEMS AND METHODS FOR MEASURING EXTRUDED CERAMIC LOGS

CROSS REFERENCE TO RELATED APPLICATION

This application claims the benefit of priority to U.S. Provisional Application No. 61/333,938, filed on May 12, 2010.

FIELD

This disclosure generally relates to measuring extruded ceramic logs, and in particular to laser scanning systems and methods for making three-dimensional measurements of extruded ceramic logs.

BACKGROUND

Ceramic honeycomb structures are used in a variety of applications, and in particular plugged ceramic honeycomb structures can be used as filters in vehicular exhaust systems to reduce pollutants. The honeycomb structures can be formed by extruding a plasticized ceramic-forming precursor in the form of a log. The log has a network of interconnected web walls that form a matrix of elongated cells which may be, for example, square, octagonal or hexagonal in shape. The network of web walls is surrounded by a cylindrical outer wall or "skin" that is integrally connected to the outer edges of the web walls of the matrix to form a cylindrical structure having opposing inlet and outlet endfaces for receiving and expelling exhaust gases through the matrix of cells.

The extruded log needs to be measured to ensure it meets specifications with respect to its size and shape, and in particular with respect to the amount of bow in an axial direction, in the direction of extrusion.

SUMMARY

The systems and methods disclosed herein can provide quick and efficient measurement of extruded logs, particularly related to log shape, during manufacture. The systems and methods disclosed herein preferably provide a non-contact measurement of the extruded log, thereby also helping to reduce the risk of physically damaging the log. As used herein, a ceramic log refers to an extruded, generally cylindrical body comprised of a ceramic composition and/or a ceramic-forming composition, that can be sintered and/or reaction sintered, to form a ceramic article upon heating of the log. The ceramic log may vary from its generally cylindrical shape due to imperfections in the manufacturing process.

It is to be understood that both the foregoing general description and the following detailed description present embodiments of the disclosure, and are intended to provide an overview or framework for understanding the nature and character of the disclosure as it is claimed. The accompanying drawings are included to provide a further understanding of the disclosure, and are incorporated into and constitute a part of this specification. The drawings illustrate various embodiments of the disclosure and, together with the description, serve to explain the principles and operations of the disclosure. In some of the Figures, Cartesian coordinates are shown for reference.

DESCRIPTION OF THE DRAWINGS

FIG. 3 is a close-up, top-down view of the conveyor in the process of transporting ceramic logs supported by trays from the extruder unit to the drying unit;

DETAILED DESCRIPTION

Reference is now made in detail to embodiments of the disclosure, examples of which are illustrated in the accompanying drawings. Whenever possible, the same or like reference numbers are used throughout the drawings to refer to the same or like parts.

Figure 1:
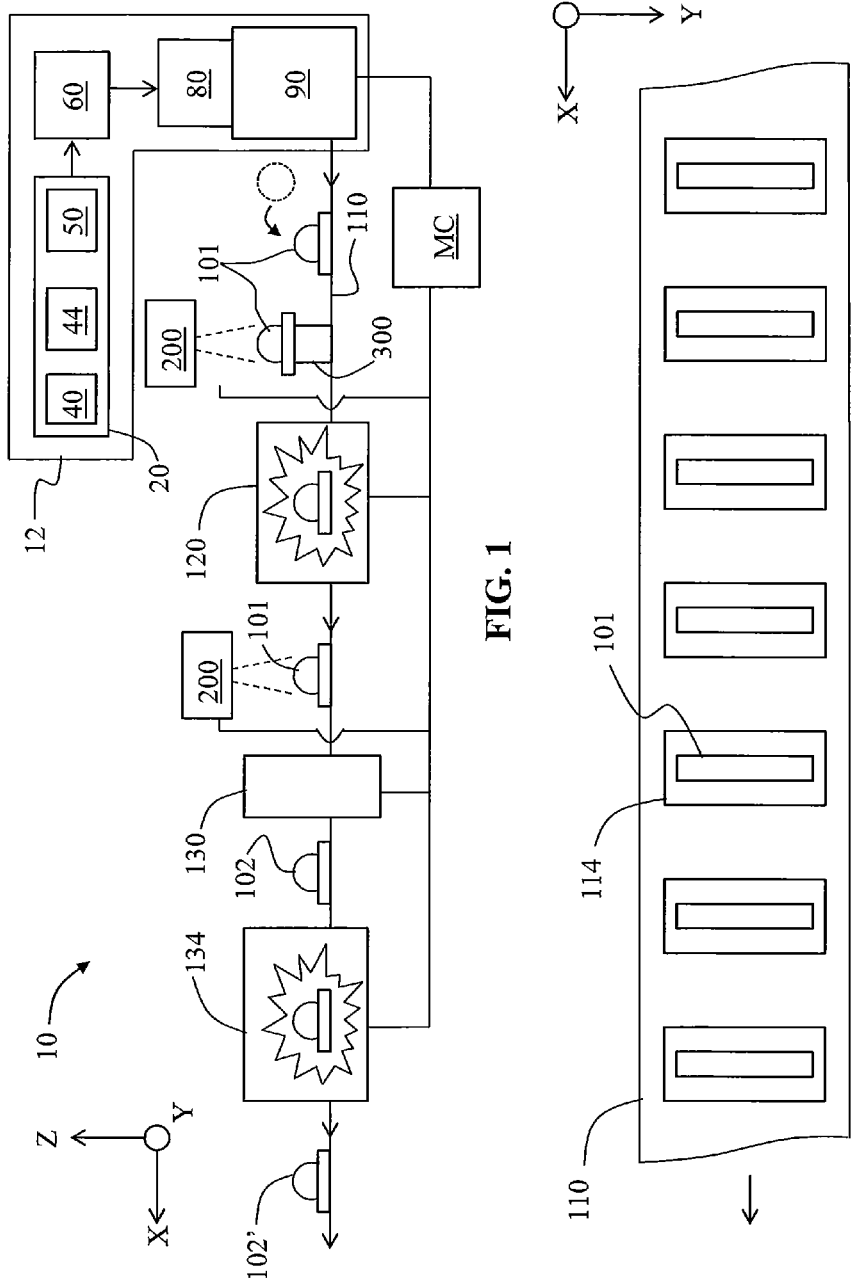
FIG. 1 is a schematic diagram of an example extrusion system used to create fired ceramic articles from ceramic logs formed by extrusion, where the system includes two laser scanning systems for measuring the ceramic logs at different stages during the manufacturing process.
Figure 2:
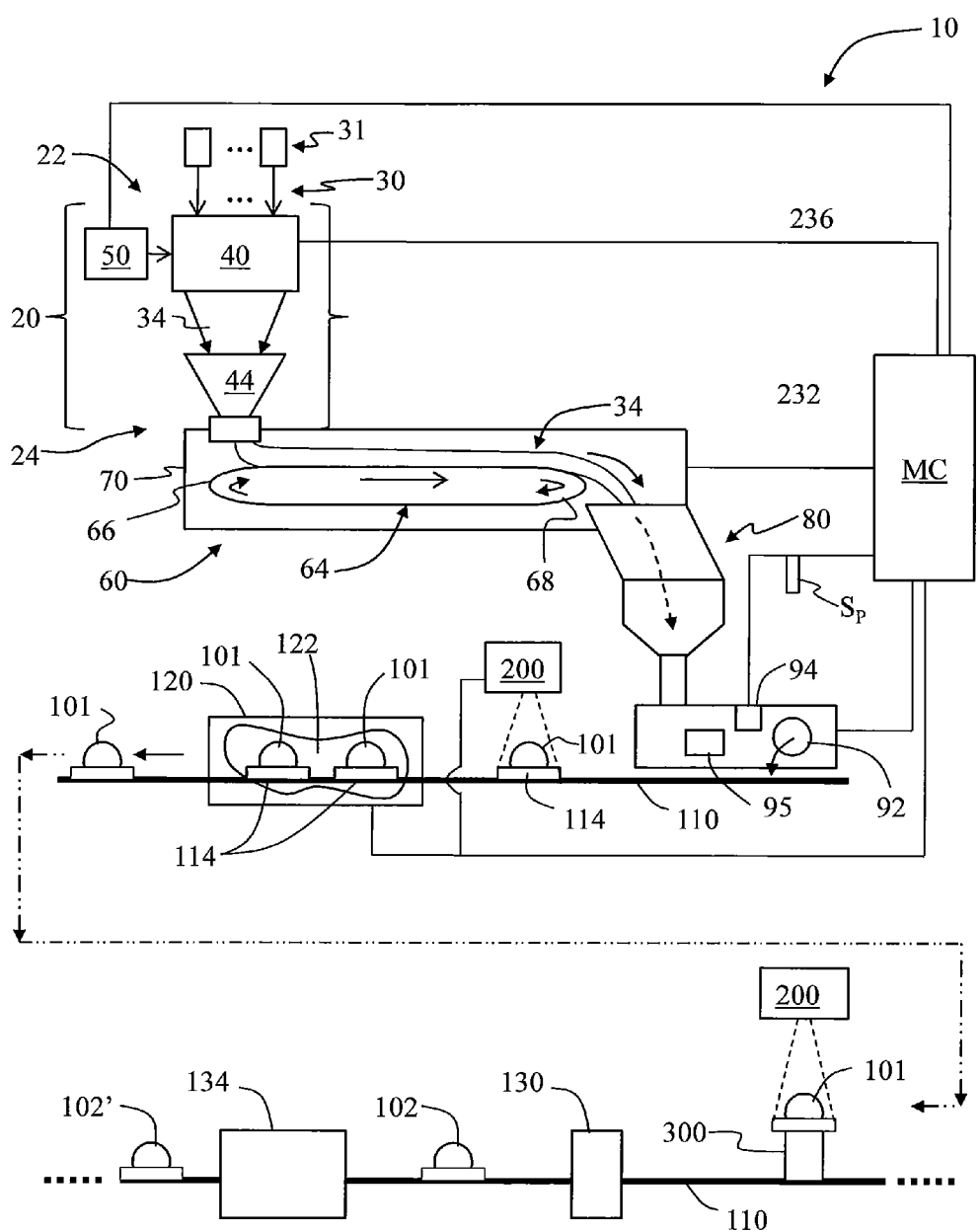
FIG. 2 is a more detailed schematic diagram of the example extrusion system of FIG. 1.

FIG. 1 is a generalized schematic diagram and FIG. 2 is a more detailed schematic diagram of an example embodiment of an extrusion system 10 used to create ceramic articles from ceramic logs formed by extruding a ceramic-forming extrusion material. Extrusion system 10 includes an extruder portion 12 that has a mixing stage or "wet tower" 20 having an input end 22 and an output end 24. Wet tower 20 initially receives at input end 22 the various batch material constituents 30 in dry form from respective constituent sources 31, and mixes them along with water (and optionally oil) to form an initial ceramic-forming batch material 34. The aqueous-based ceramic precursor mixture formed in wet tower 20 preferably comprises a batch material mixture of ceramic (such as cordierite) forming inorganic precursor materials, an optional pore former such as graphite or starch, a binder, a lubricant, and a vehicle. The inorganic batch material components can be any combination of inorganic components (including one or more ceramics) which can, upon firing, provide a porous ceramic having primary sintered phase composition (such as a primary sintered phase composition of cordierite or aluminum titanate).

Wet tower 20 includes, for example, a mixer 40 followed by a rotary cone 44. Wet tower 20 also includes a water unit 50 configured to provide water to mixer 40 in select amounts, e.g., by weighing the amount of water added to the mixer. In an example embodiment, water unit 50 is controlled manually and/or automatically, as discussed below. Examples of batch material 34 are discussed below.

Extruder portion 12 further includes a conveyer unit 60 arranged adjacent output end 24 of wet tower 20. Conveyor unit 60 includes a conveyor belt 64 with an input end 66 and an output end 68. Conveyor belt 64 rotates clockwise as shown. Conveyor unit 60 includes a protective cover 70.

Conveyor belt input end 66 is arranged at the output end 24 of wet tower 20 to receive batch material 34 therefrom. In an example embodiment, rotary cone 44 serves to deliver batch material 34 to conveyor belt input end 66 in a relatively uniform layer. Wet tower 20 is configured to adjust the thickness of the layer of batch material 34 carried by conveyor belt 64.

The extruder portion 12 of extrusion system 10 further includes a chute 80 and an extrusion unit 90. Chute 80 is arranged between conveyor unit 60 and extrusion unit 90. Chute 80 is configured to receive batch material 34 from the output end 68 of conveyor belt 64 and deliver it to extrusion unit 90. Extrusion unit 90 is configured to receive batch material 34 and form billets therefrom, which are then pressed through an extrusion die 92 (e.g., by a twin-screw extruder) to form an extrudate 100. In an example embodiment, extrusion unit 90 includes multiple extrusion dies that operate at once to simultaneously form multiple extrudates 100.

In an example embodiment, extrusion system 10 includes a pressure sensor 94 in extrusion unit 90 electrically connected to a master controller MC and configured to measure the pressure during extrusion. Pressure sensor generates an electrical signal Sp that is sent to and received by master controller MC, which processes and preferably displays the pressure measurements on a display (not shown). This feedback allows the master controller MC to control the extrusion process.

Figure 4:
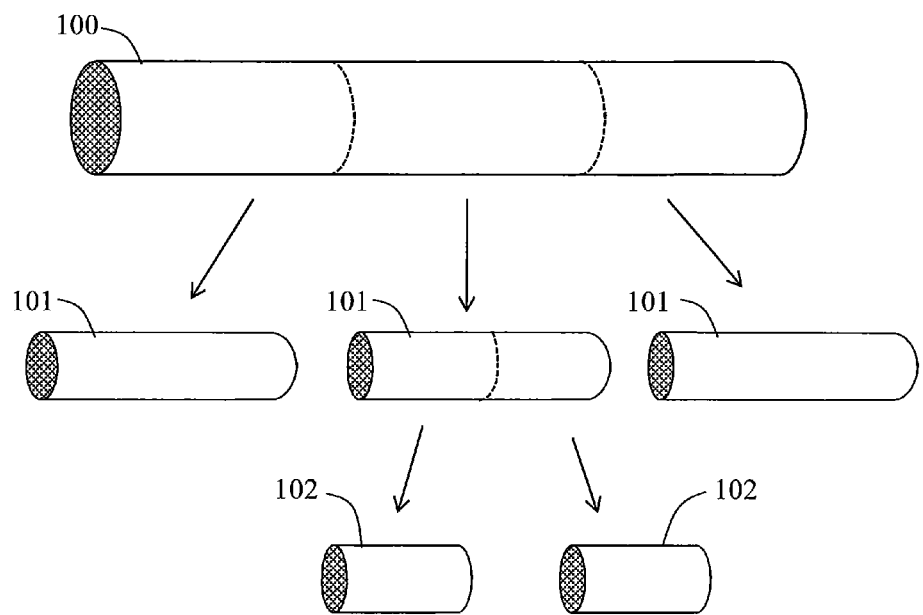
FIG. 4 is an isometric view of an example cylindrical extrudate formed by extrusion using the extrusion system of FIG. 1 and FIG. 2, and also showing how the extrudate is cut into logs and then into smaller pieces (wares) prior to firing.

Extrudate 100 is deposited onto a conveyor 110 arranged adjacent extrusion die 92. In an example embodiment, extrudate 100 is cut into sections called "logs" 101, as shown in FIG. 4 and in FIG. 5 The cross-sectional shape can be round or non-round, e.g., oval. Logs 101 are supported in trays 114. FIG. 3 is a top-down close-up view of conveyor 110 showing logs 101 supported in trays 114 being conveyed in the +X direction away from extrusion unit 90.

At this point, logs 101 are "green" and "wet". The green and wet logs 101 are conveyed by conveyor 110 to a drying station (e.g., an oven or "applicator") 120. Drying station 120 has an interior 122 where logs 101 reside while drying. Drying station 110 may use, for example, radio-frequency (RF) radiation or microwave frequency (MF) radiation, to effectuate drying.

Extrusion system 10 also includes a cutting station 130 for cutting dried logs 101 into smaller pieces or wares 102 (see FIG. 4) and a firing station 134 downstream of drying station 120 for firing the smaller, dried wares.

Extrusion system 10 further includes at least one laser scanning measurement system 200 disposed adjacent and above conveyor 110. The example extrusion system 10 of FIG. 1 and FIG. 2 includes a first laser scanning system 200 disposed between extrusion unit 90 and drying station 120 and a second laser scanning system disposed between the drying station and firing station 134.

Figure 5:
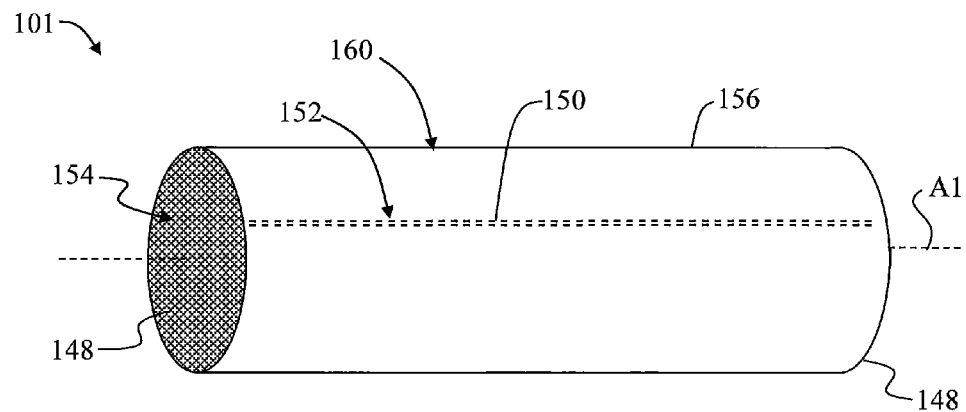
FIG. 5 is a close-up, isometric view of an example ceramic log.

FIG. 5 is a close-up view of an example ceramic log 101. Ceramic log 101 has a central axis A1, opposite endfaces 148 and a matrix of intersecting, thin, porous walls 150 that extend across and between the endfaces and that define longitudinally extending cells 152 that collectively form a honeycomb structure 154. Honeycomb structure 154 is surrounded by an outer skin 156 that defines an outer surface 160. Both endfaces 148 have the same general contour shape, such as circular or oval.

The contours of outer skin 156 and endfaces 148 define an overall shape of outer surface 160, and this shape is referred to as the "surface shape." This shape can vary from being perfectly cylindrical due to imperfections in the extrusion process. The surface shape taken at a given cross-section perpendicular to axis A1 is referred to as the "two-dimensional surface shape," while the surface shape of an extended portion of outer surface 160 is referred to as the "three-dimensional surface shape."

In an example embodiment, master controller MC is operably connected to wet tower 20, to conveyor units 60 and 110, to extruder 90, to drying station 120 and to the at least one laser scanning system 200, and is configured to control the operation of these system components to control the overall operation of the extrusion system.

When logs 101 are sufficiently dry (meaning that most or all of the liquid initially present in the logs has been removed so that the moisture content has been reduced to a level acceptable for cutting and firing), they are cut into smaller greenware pieces 102 (see FIG. 4) at cutting station 130. Greenware pieces 102 are then fired at firing station 134, which includes for example a hot-air oven or kiln. The resultant heat transforms the relatively soft and fragile dried greenware pieces 102 into hardened, fired wares 102' having a rigid honeycomb structure 154 and outer surface 160 with a fixed surface shape. In an example embodiment, fired wares 102' are used to form ceramic filters wherein the ceramic is porous enough to allow fluid (gas and/or liquid) to flow therethrough.

Exemplary AT-based ceramic materials are discussed in U.S. Pat. No. 7,001,861, U.S. Pat. No. 6,942,713, U.S. Pat. No. 6,620,751, and U.S. Pat. No. 7,259,120, which patents are incorporated by reference herein. Such AT-based bodies may be used as an alternative to cordierite and silicon carbide (SiC) bodies for high-temperature applications, such as automotive emissions control applications. The systems and methods disclosed herein apply to any type of extruded greenware.

During the manufacturing process, the wet and dried green ceramic logs 101 preferably have a surface shape that conforms to a particular specification, for example as defined by a desired end product shape. For example, where the end product is a filter, ceramic logs 101 preferably have a surface shape consistent with that of the filter holder prior to firing the logs and fixing the surface shape. In some applications, a resultant filter might not sit properly in the filter holder if it has a surface shape that does not meet the filter specification. Thus, the measurement of the surface shape allows for out-of-spec ceramic logs to be rejected before they are processed into end products. Further, measurement of the surface shape provides feedback for the manufacturing process and allows the manufacturing process to be adjusted so that the surface shape deviations can be corrected.

Laser Scanning Measurement System

Figure 6:
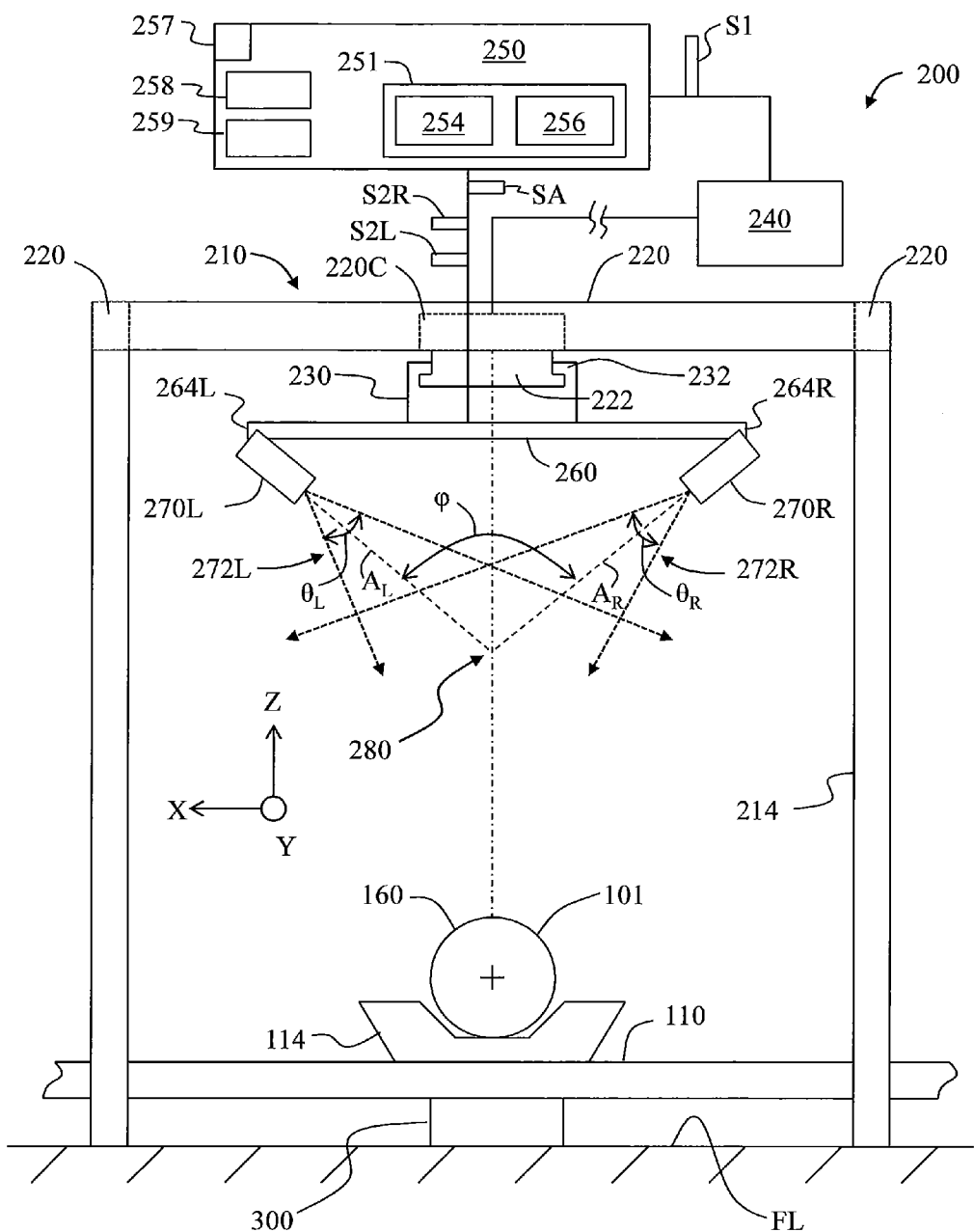
FIG. 6 is a view the −Y-direction and FIG. 7 is a view in the −X-direction of an example laser scanning system arranged relative to a ceramic log supported by a tray on a conveyor, where the tray needs to be lifted from the conveyor to place the ceramic log in the measurement position.
Figure 7:
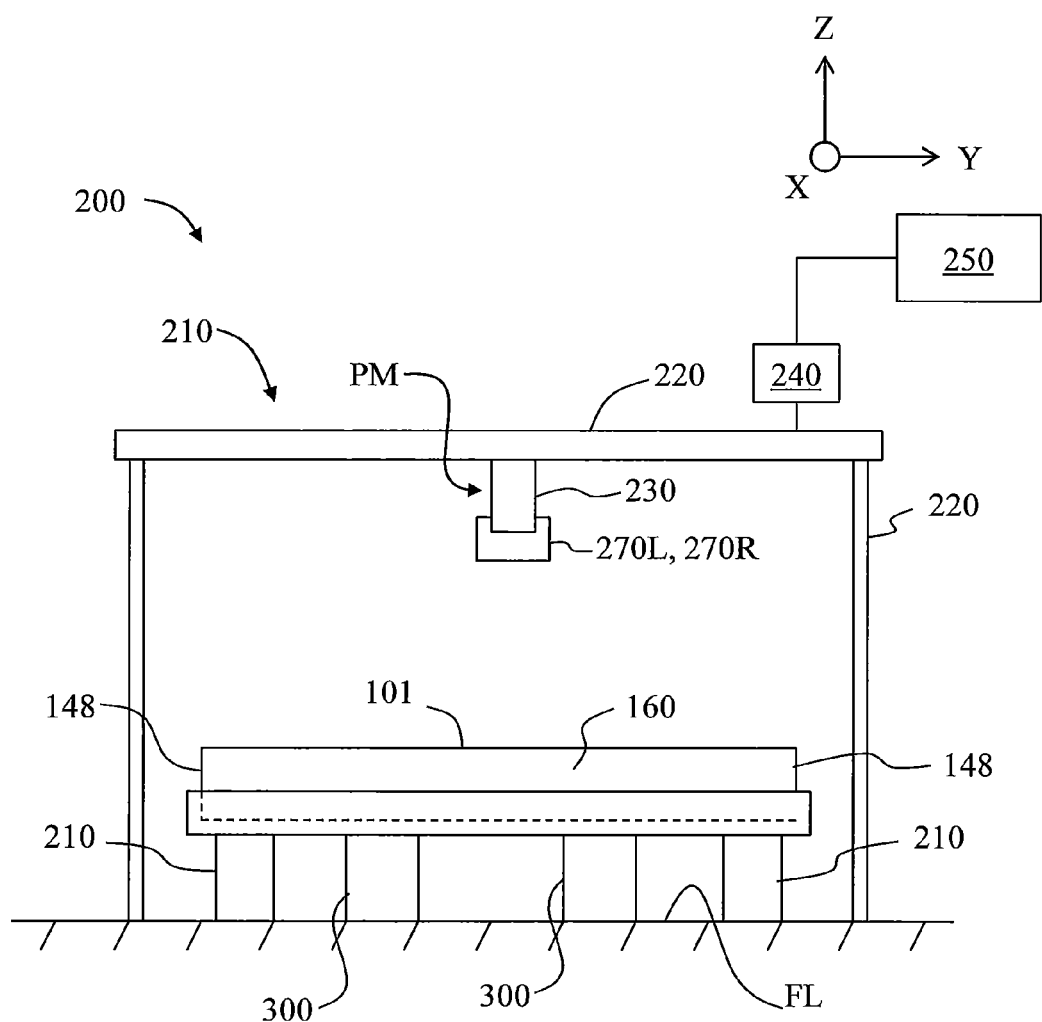

FIG. 6 is a front-on view (i.e., in the −Y-direction) and FIG. 7 is a side view (i.e., in the −X-direction) of an example embodiment of laser scanning system 200, along with log 101 supported by tray 114. Laser scanning system 200 includes a support frame 210 having vertical support columns 214 oriented in the Z-direction and mechanically connected to horizontal crossbeams 220 oriented in the X and Y directions. Support frame 210 is fixed to or solidly rests upon a floor FL. A central cross-beam 220C runs in the Y direction in the center of the support frame. Central cross-beam 220C supports a mounting fixture 230 in a manner that allows the mounting fixture to move in the Y-direction. In an example, central cross-beam 220C includes a flanged section that runs in the Y-direction, and mounting fixture 230 includes a central channel configured to slidingly engage the central cross-beam at the flanged section so that the mounting fixture can move in the Y-direction. Other known movable mount configurations can also be used.

Laser scanning system 200 also includes a drive unit 240 operably connected to mounting fixture 230 to move the mounting fixture. Drive unit 240 is operably connected to a controller 250 that controls the movement of mounting fixture 230 along central cross-beam 220C via drive unit 240, including stepping the mounting fixture in the Y-direction in select increments (e.g., 1 mm). In an example embodiment, drive unit 240 includes a motor, such as a stepping motor or servo-motor. In one example, drive unit 240 is incorporated into movable mount 230. In another example, drive unit 240, mounting fixture 230 and central cross-beam 220C may comprise a servo motor and a servo slide mechanism.

In an example embodiment, controller 250 is part of main controller MC. Also in an example embodiment, controller 250 is or includes a computer 252 (e.g., a personal computer (PC), workstation, etc.) with processor 254 and a memory unit ("memory") 256, and includes an operating system such as Microsoft WINDOWS® or LINUX. In an example embodiment, processor 254 is or includes any processor or device capable of executing a series of software instructions and includes, without limitation, a general- or special-purpose microprocessor, finite state machine, controller, computer, central-processing unit (CPU), field-programmable gate array (FPGA), or digital signal processor. Also, memory 256 includes refers to any processor-readable medium, including but not limited to RAM, ROM, EPROM, PROM, EEPROM, disk, floppy disk, hard disk, CD-ROM, DVD, or the like, on which may be stored a series of instructions executable by processor 254.

The surface shape measurement methods described herein may be implemented in various embodiments via a set of machine readable instructions (e.g., computer programs and/or software modules) stored in memory 256 and operable in processor 254 for causing controller 250 to operate laser scanning system 200 to perform the measurement methods described herein. In an example embodiment, the computer programs run on image processor 254 out of memory 256, and may be transferred to main memory from permanent storage via a disk drive or port 257 when stored on removable media 116, or via a network connection or modem connection when stored outside of controller 250, or via other types of computer or machine-readable media from which it can be read and utilized.

The computer programs and/or software modules may comprise multiple modules or objects to perform the various methods described herein, and control the operation and function of the various components in laser scanning system 200. The type of computer programming languages used for the code may vary between procedural code-type languages to object-oriented languages. The files or objects need not have a one-to-one correspondence to the modules or method steps described. Further, the method and apparatus may comprise combinations of software, hardware and firmware. Firmware can be downloaded into processor 254 for implementing the various example embodiments described herein.

Controller 250 optionally includes a data-entry device 258, such as a keyboard, that allows a user of laser scanning system 200 to input information into controller 250 (e.g., the part number), and to manually control the operation of the laser scanning system. Controller 250 further optionally includes a display 259 that can be used to display information using a wide variety of alphanumeric and graphical representations. For example, display 259 is useful for displaying the measured three-dimensional surface shape, as well as any of individual two-dimensional surface shapes, as discussed below.

Figure 8:
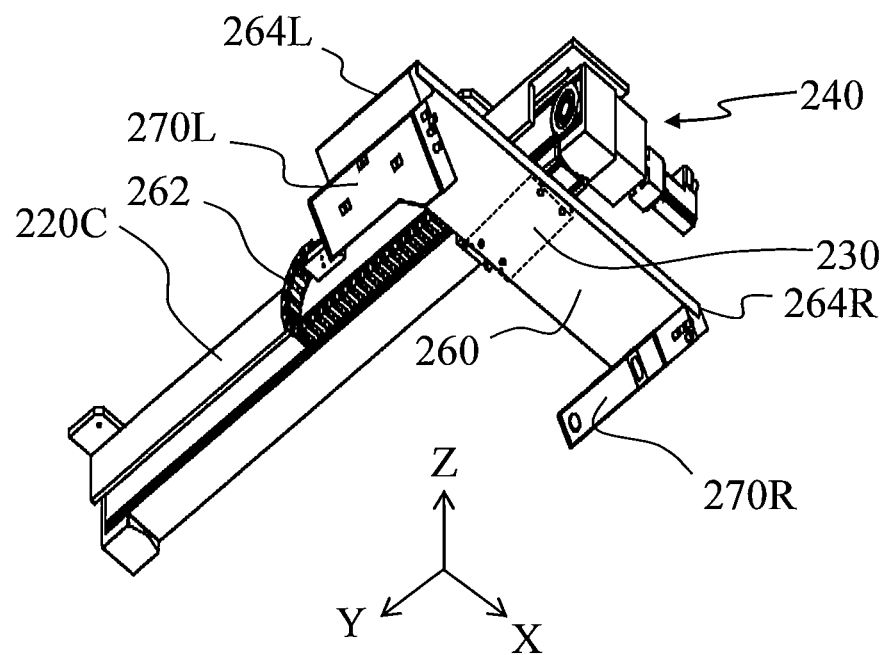
FIG. 8 is a bottom-up view of an example support arm with the laser scanners attached at opposite ends, with the support arm attached to the central beam of the support structure.
Figure 9:
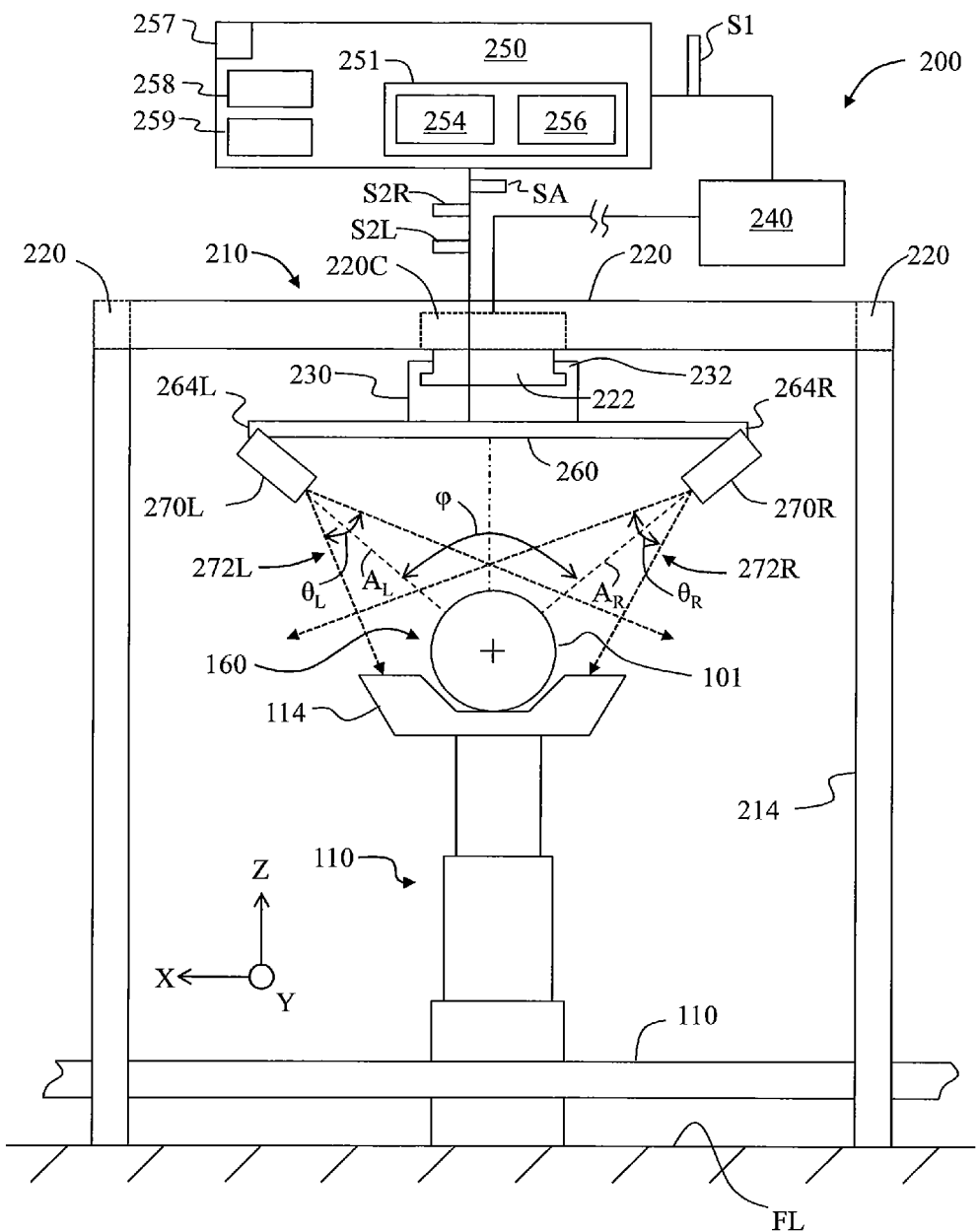
FIG. 9 and FIG. 10 are similar to FIG. 6 and FIG. 7, except that the lifting mechanism has been activated to place the ceramic log in the measurement position above the conveyor.

Laser scanning system 200 also includes a support arm 260 attached to mounting fixture 230. FIG. 8 is a bottom-up view of an example support arm 260 and mounting fixture 230 as attached to central beam 220C. An electrical cable 262 that connects controller 250 (not shown in FIG. 8) to laser scanners 270L and 270R is shown in FIG. 8. Support arm 260 includes opposite ends 264L and 264R to which are attached respective laser scanners 270L and 270R.

With reference again to FIG. 6, laser scanners 270L and 270 have, when activated, respective two-dimensional laser scan paths 272L and 272R that include respective central axes $A_L$ and $A_R$ and that subtend respective scanning angles $\theta_L$ and $\theta_R$. Central axes $A_L$ and $A_R$ intersect at a location 280 and define a central angle $\phi$ between laser scan paths 272L and 272R. Location 280 serves as a reference for defining a measurement position MP, which is the position where ceramic log 101 can be scanned by laser scanners 270L and 270R. An exemplary measurement position is when ceramic log central axis A1 coincides with location 280. In an example embodiment, scan paths 272L and 272R overlap on ceramic log outer surface 160 when ceramic log 101 is in the measurement position. Laser scanners 270 suitable for use in laser scanning system 200 are available, for example, from Sick AG, Waldkirch, Germany, model no. IVC-3D 100.

Support frame 210 is arranged relative to conveyor 110 so that the conveyor can move trays 114 into place below laser scanners 270L and 270R, thereby allowing for an in situ measurement of ceramic log 101. In the example embodiment illustrated in FIGS. 6, 7, 9 and 10 (and also shown in one of the laser scanning systems 200 in FIG. 1 and FIG. 2), laser scanning system 200 includes a lifting mechanism 300 configured to lift tray 114 and the ceramic log 101 supported thereby so that ceramic log 101 is placed at the measurement position. This allows for scan paths 272L and 272R to be incident upon ceramic log outer surface 160 at a particular axial location, i.e., at a given Y-position, as discussed in greater detail below.

Lifting mechanism 300 allows for ceramic log 101 and tray 114 to be physically isolated from conveyor 110 when the ceramic log is being measured so that vibrations caused by the movement of the conveyor do not adversely affect the laser scanning measurements.

Figure 10:
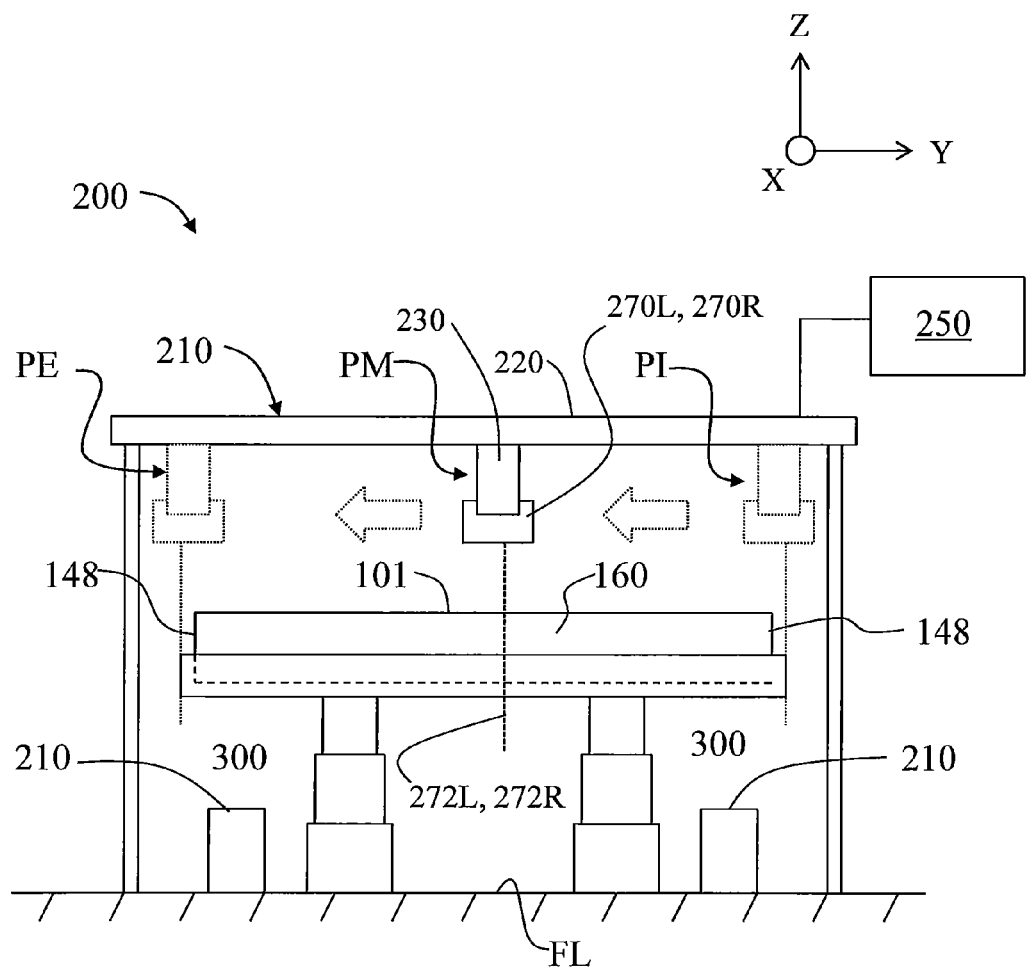
Figure 11:
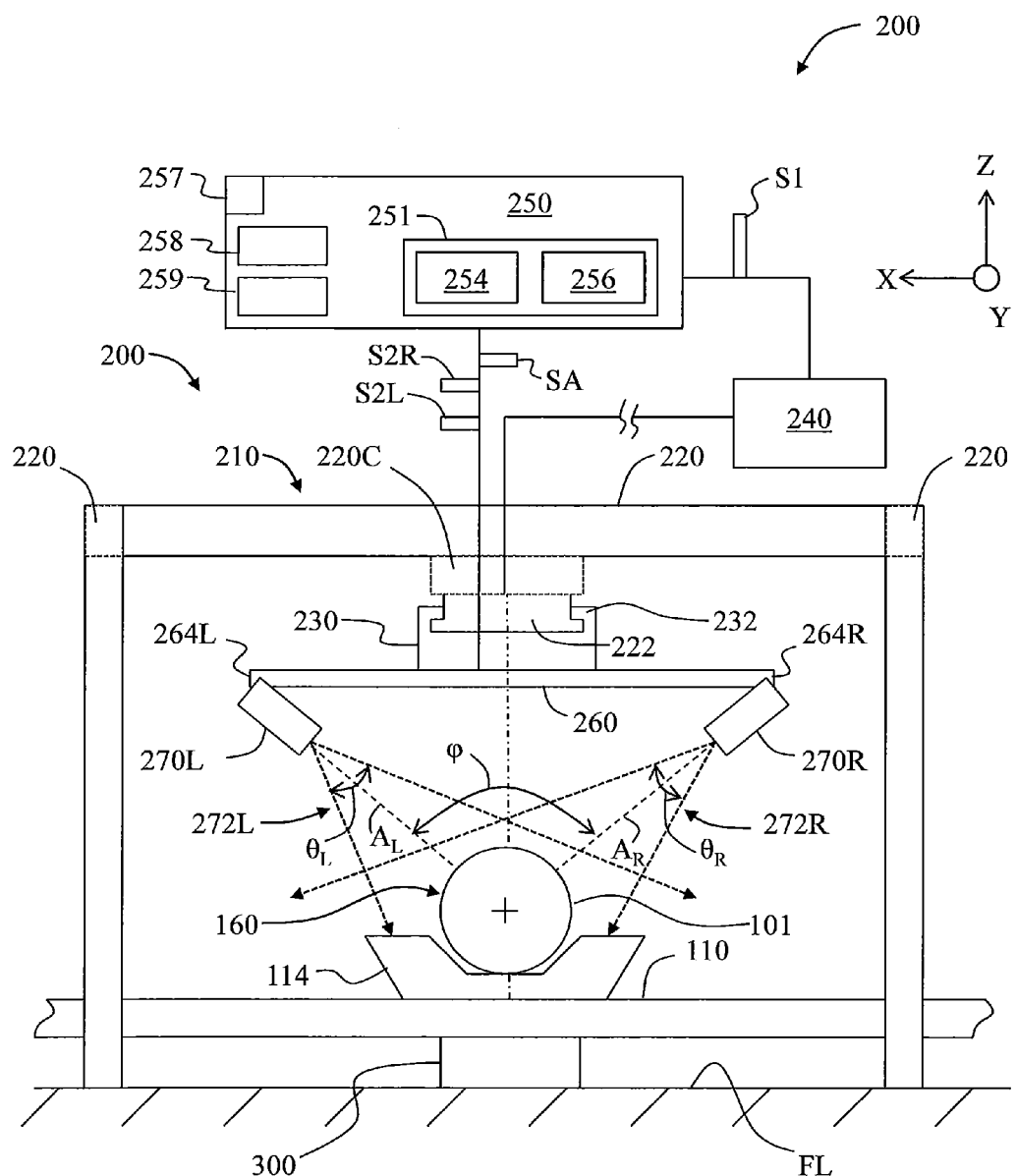
FIG. 11 shows an embodiment of the laser scanning system similar to that shown in FIG. 6, except that the system is configured so that laser scanning measurements can be taken with the ceramic log and tray resting on an unmoving conveyor.

In an alternative embodiment illustrated in FIG. 10 and FIG. 11, ceramic log 101 and tray 114 remain on conveyor 110 and the conveyor is stopped while laser scanning measurements are taken. In this case, support structure 210 is configured so that laser scanning measurements can be taken when ceramic log 101 is conveyed by conveyor 110 to the measurement position while tray 114 resides on the conveyor.

In the operation of laser scanning system 200, once ceramic log 101 is disposed in the measurement position, controller 250 sends a control signal 51 to drive unit 240 to move mount 230 and thus laser scanners 270L and 270R into an initial Y position PI (FIG. 10) for scanning the ceramic log. In one example, initial position PI is such that the laser scan paths 272L and 272R are adjacent endface 148 so that they are not incident upon outer surface 160 but are incident upon tray 114. Controller 250 then sends control signals 51 to driver unit 240 to move mount 230 and thus laser scanners 270L and 270R in the −Y-direction in small increments, e.g., about 1 mm. For each Y-position, controller 250 activates laser scanners 270L and 270R with an activation signal SA so that they perform a two-dimensional scan of outer surface 160 of ceramic log 101. For a tray 114 having a length of 1000 mm, performing two-dimensional scans in 1 mm increments results in 1000 two-dimensional surface-shape measurements.

FIG. 10 also shows an intermediate or middle Y-position PM at about the middle of ceramic log 101, and an end position PE just adjacent the opposite endface 148 from initial position PI. The raw scan data from each Y-position is sent to controller 250 via respective scan signals S2L and S2R, thereby forming two sets of raw two-dimensional scans ("two-dimensional scan data") that are stored in memory 256. The two sets of two-dimensional scan data are then combined by processor 254 to form a single set of raw three-dimensional scan data for ceramic log 101. Note that since scan paths 272L and 272R can include portions of tray 114, the two-dimensional scan data and the three-dimensional scan data can also include tray information (tray scan data).

The raw scan data are stored in memory 256 and can be analyzed by processor 254 in a variety of ways to establish measurement information about ceramic log 101. A preliminary data processing step includes finding the ceramic log ends (i.e., the axial locations of endfaces 148) by comparing adjacent scan data and finding where the tray measurements end and the outer surface measurements begin. This also provides a measurement of the log length. Once the ceramic logs ends are established, the raw scan data can be separated into log scan data and tray scan data.

Figure 12:
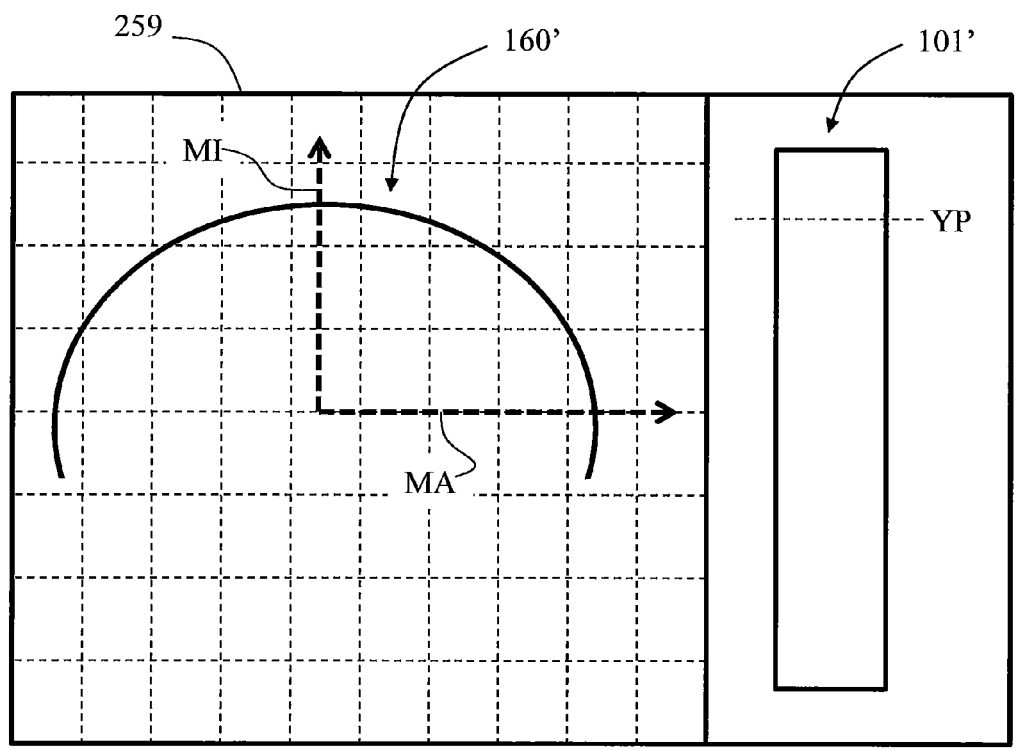
FIG. 12 illustrates an example two-dimensional measured surface shape profile as determined by the controller from the two-dimensional scan data and displayed on the controller display.

Another preliminary data processing step includes combining the two sets of two-dimensional scan data from laser scanners 270L and 270R to obtain a composite two-dimensional scan for each Y-position. This combining step can be carried out in processor 254 based on instructions stored in memory 256. In an example embodiment, the information from the overlap of scan paths 272L and 272R is used to stitch the two two-dimensional scans together to establish a single two-dimensional surface shape for each Y-position. FIG. 12 illustrates an example two-dimensional measured surface shape 160' as determined by controller 250 from the two-dimensional scan data and displayed on controller display 259. Major and minor axes MA and MI are shown for reference. Note that an image 101' of ceramic log 101 is displayed as well, showing the Y-position YP at which the scan was taken.

Figure 13:
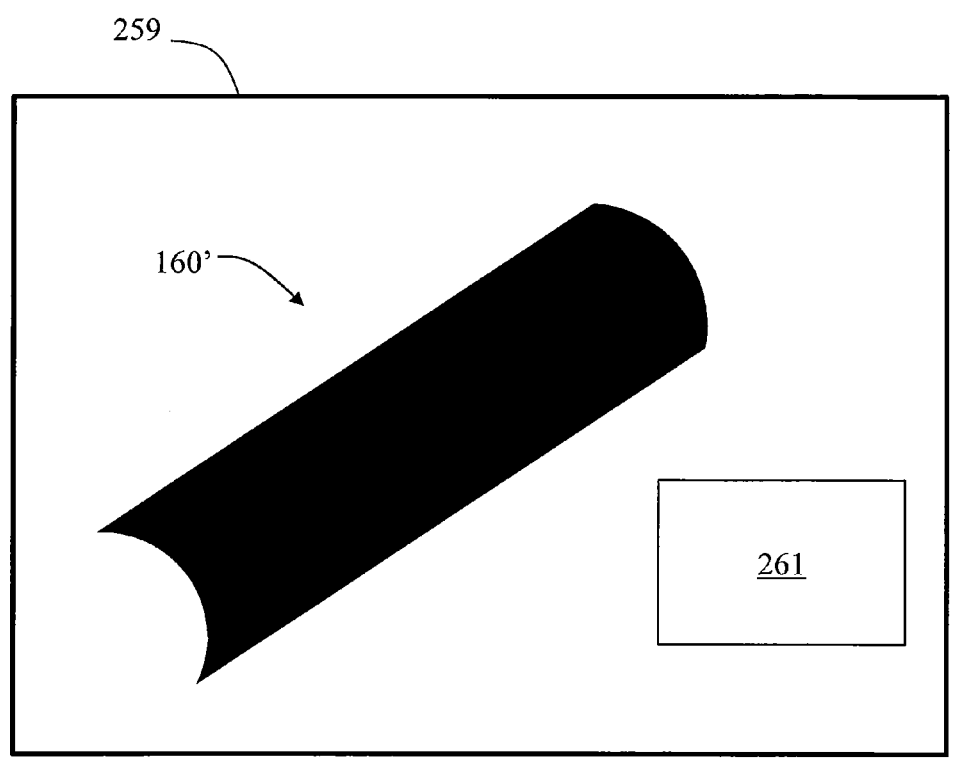
FIG. 13 illustrates an example three-dimensional image of the measured surface shape of a ceramic log as determined by the controller from the three-dimensional scan data and displayed on the controller display.

Once the log scan data is obtained, then the two-dimensional log data can be combined (e.g., in processor 254) to form the three-dimensional surface shape. FIG. 13 illustrates an example three-dimensional image 101' of the measured surface shape of ceramic log 101 as displayed on controller display 259. Parameters relating to the surface shape can also be calculated and displayed with image 101', such as the measured log length, the amount of bow along the major and minor axes, the maximum amount of bow, bow limit, etc. An example of the measurement values that can be displayed in a window 261 on controller display 259, along with the three-dimensional image 101', is shown in Table 1 below:

TABLE 1

EXAMPLE LOG MEASUREMENT VALUES

| PARAMETER | VALUE (INCHES) |
|---|---|
| TOTAL LOG LENGTH | 33.51 |
| BOW - MAJOR AXIS | 0.034 |
| BOW - MINOR AXIS | 0.038 |
| BOW - MAXIMUM | 0.041 |

In an example, the amount of bow is established by deducing from the two-dimensional scan data relative height measurements of outer surface 160 at three spaced-apart locations (e.g., at the middle and the respective ends) of ceramic log 101 in analogous fashion to a contact measurement.

Figure 14:
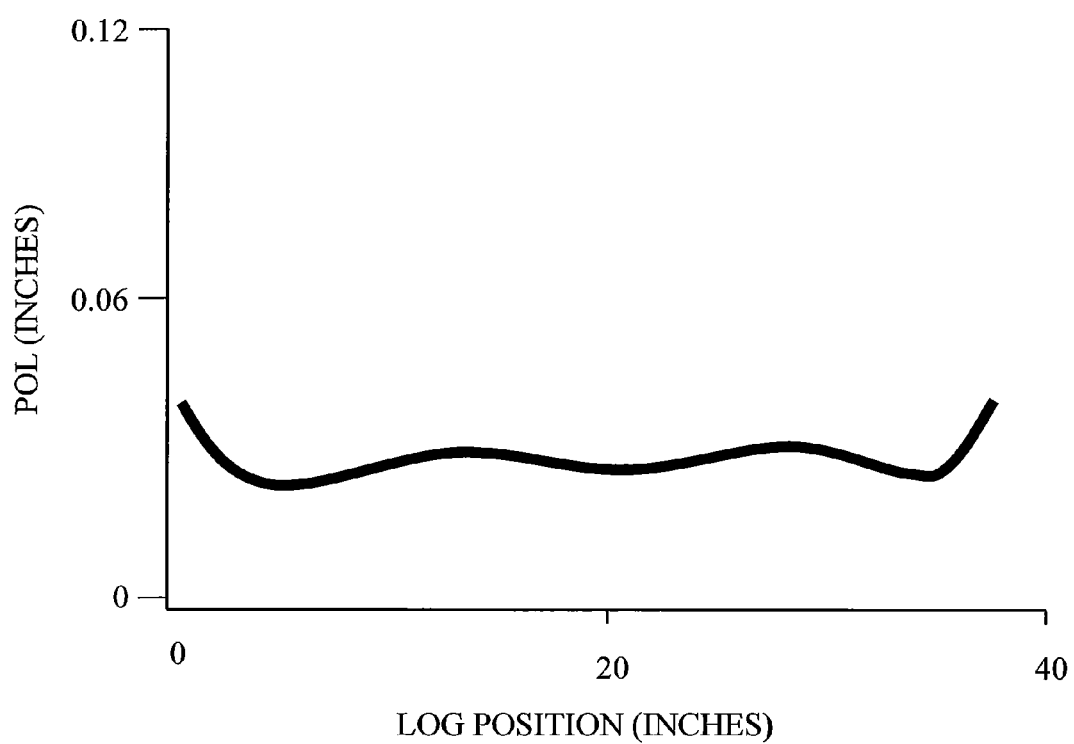
FIG. 14 plots an example of the "profile of the line" (POL) in inches versus the log position in inches based on hypothetical two-dimensional scan data.

FIG. 14 plots an example of the "profile of the line" (POL) in inches versus the log position (i.e., the Y position along the log) in inches based on hypothetical laser scan data. The plot shows substantial variation in the POL at the ceramic log ends with smaller variations in between. The POL plots can also be displayed on controller display 259.

In an example, the results of processing the log scan data and/or the tray scan data in controller 250 to obtain a ceramic log measurement is used to adjust the extrusion process for forming ceramic logs 101. Because the surface shape of ceramic log outer surface 160 is determined by the extrusion process, and the extrusion process includes many variables such as die shape, flow rate, pressure, moisture content of the batch material, etc., one or more of the extrusion process parameters can be adjusted based on the ceramic log measurements obtained by laser scanning system 200.

In one case, if the measured log length is out of specification, then this information can be used to adjust the cutting of extrudate 100 into green ceramic logs at the exit of extrusion unit 90. In another example, impedance plate 95 in extrusion unit 90 is adjusted to adjust the flow of batch material 34 through die 92 when forming extrudate 100. For example, when a ceramic log 101 has a "banana" type bow, it is indicative of different flow rates of batch material 34 through die 92. Thus, when an upward banana-type of bow is measured, impedance plate 95 in extrusion unit 90 is adjusted to reduce the rate of flow through the bottom of the die to reduce or remove the bow. Also, as discussed above, in an example, one or more ceramic log measurements, such as bow and log length, are compared to corresponding limits, such as a bow limit and a log-length limit, to reject ceramic logs 101 that are out of specification.

In an example, the tray scan data is processed to determine if the tray 114 carrying ceramic log 101 has any shape variations that are being imparted to the ceramic log. The processing of tray scan data by controller 250 can also be used to compare to at least one tray standard to determine which if any trays are non-conforming and, removing the non-conforming trays from the manufacturing process.

While the disclosure has been described with respect to several preferred embodiments, various modifications and additions will become evident to persons of skill in the art. All such additions, variations and modifications are encompassed within the scope of the disclosure, which is limited only by the appended claims, and equivalents thereto.

What is claimed is:

1. A method of performing an in-situ measurement within an extrusion system of a surface shape of an extruded ceramic log supported by a tray, the log having an axis and an outer surface, the method comprising:

during a manufacturing process within an extrusion system that forms the log, moving first and second laser scanners over the log and tray in a direction of the log axis and stopping at a plurality of log axial positions, wherein the first and second laser scanners have respective first and second optical paths;

performing over the first and second optical path respective first and second laser scans of a portion of the log outer surface not obscured by the tray at each log axial position to form first and second sets of two-dimensional surface shape measurements; and combining the first and second sets of two-dimensional surface shape measurements to form a three-dimensional measurement of the surface shape.

2. The method of claim 1, further comprising:
establishing, based on the three-dimensional surface shape measurement, at least one of an amount of bow in the log and a log length.

3. The method of claim 1, further comprising:
performing the first and second laser scans to include scanning a portion of the tray to obtain tray scan data combined with log scan data, with the log scan data including the first and second sets of two-dimensional surface shape measurements; and
separating the tray scan data from the log scan data.

4. The method of claim 3, further comprising comparing the tray scan data to at least one tray standard to determine if the tray is non-conforming to the at least one tray standard.

5. The method of claim 2, further comprising comparing at least one of the amount of bow and the log length to at least one of a bow limit and a log-length limit.

6. The method of claim 1, including:
performing with the extrusion system an extrusion process on a ceramic-forming batch material to form the extruded ceramic log; and
adjusting the extrusion process based on at least one of the amount of bow and the log length as established by the three-dimensional surface shape measurement.

7. The method of claim 1, wherein the log axial positions are spaced apart by about 1 mm.

8. The method of claim 1, further comprising:
including at least a portion of the tray in the first and second laser scans; and
measuring a tray shape.

9. The method of claim 1, further comprising:
conveying the tray along a conveyor path with a conveyor; and
lifting the tray above the conveyor path to place the log outer surface in the first and second optical paths.

10. The method of claim 1, further comprising:
conveying the tray along a conveyor path with a conveyor; and
stopping the conveyor while performing the first and second laser scans.

* * * * *